United States Patent
Wang et al.

(10) Patent No.: US 10,135,639 B2
(45) Date of Patent: Nov. 20, 2018

(54) MULTICARRIER COMMUNICATION SYSTEM AND CHANNEL ESTIMATION METHOD THEREOF

(71) Applicant: National Tsing Hua University, Hsinchu (TW)

(72) Inventors: Chin-Liang Wang, Hsinchu (TW); Shao-Cheng Wang, Taichung (TW)

(73) Assignee: National Tsing Hua University, Hsinchu (TW)

( * ) Notice: Subject to any disclaimer, the term of this patent is extended or adjusted under 35 U.S.C. 154(b) by 0 days.

(21) Appl. No.: 15/679,163

(22) Filed: Aug. 17, 2017

(65) Prior Publication Data
US 2018/0212799 A1    Jul. 26, 2018

(30) Foreign Application Priority Data
Jan. 25, 2017  (TW) .............................. 106102851 A (51) Int. Cl.
*H04L 1/18*    (2006.01)
*H04L 25/02*    (2006.01)
(Continued)

(52) U.S. Cl.
CPC ........ *H04L 25/0242* (2013.01); *H04L 5/0048* (2013.01); *H04L 27/2089* (2013.01);
(Continued)

(58) Field of Classification Search
CPC ............. H04L 25/0242; H04L 27/0289; H04L 5/0048; H04L 25/0206; H04L 27/2614;
(Continued)

(56) References Cited

U.S. PATENT DOCUMENTS

| 6,084,932 A * | 7/2000 | Veintimilla | H04B 1/69 |
| | | | 375/355 |
| 2011/0206105 A1* | 8/2011 | Lin | H04B 7/0426 |
| | | | 375/224 |

(Continued)

OTHER PUBLICATIONS

Pierre Siohan et al., "Analysis and Design of OFDM/OQAM Systems Based on Filterbank Theory", IEEE Transactions on Signal Processing, vol. 50, No. 5, May 2002, pp. 1170-1183.

(Continued)

*Primary Examiner* — Phuoc H Doan
(74) *Attorney, Agent, or Firm* — JCIPRNET (57) ABSTRACT

This invention discloses a multicarrier communication system that includes a transmitter equipment and a receiver equipment. According to a timing scheme, the transmitter equipment processes multiple original symbols for transmission on multiple subcarrier channels, and the receiver equipment processes and detects multiple received symbols from the multiple subcarrier channels. During a time frame of data transmission, the initial three of the original symbols for each of the subcarrier channels are three pilot symbols, forming a preamble. The three preambles of every consecutive three of the subcarrier channels form a preamble unit. All the pilot symbols of the preamble unit are expressed as a 3×3 matrix. When the center pilot symbol of the preamble unit is normalized to 1 or j (i.e., the imaginary unit), the matrix is $$\begin{bmatrix} -j & -j & -j \\ j & 1 & -j \\ -j & j & -j \end{bmatrix} \text{ or } \begin{bmatrix} 1 & 1 & 1 \\ -1 & j & 1 \\ 1 & -1 & 1 \end{bmatrix}.$$

(Continued)

A channel estimation method for the multicarrier communication system is also disclosed.

12 Claims, 4 Drawing Sheets

(51) Int. Cl.
*H04L 27/26* (2006.01)
*H04L 27/20* (2006.01)
*H04L 5/00* (2006.01)
*G06F 17/16* (2006.01)
*H04L 27/00* (2006.01)

(52) U.S. Cl.
CPC ........ *H04L 27/264* (2013.01); *H04L 27/2611* (2013.01); *H04L 27/2698* (2013.01); *G06F 17/16* (2013.01); *H04L 2027/0036* (2013.01)

(58) Field of Classification Search
CPC .... H04L 1/1861; H04W 80/02; H04W 72/00; H04W 84/12; H04W 76/025; H04W 4/0008; H04W 72/0406; H04W 72/0841
USPC ......... 370/329, 480; 455/101; 375/224, 232, 375/355
See application file for complete search history.

(56) References Cited

U.S. PATENT DOCUMENTS

2015/0049836 A1 2/2015 Li et al.
2016/0056936 A1 2/2016 Sun et al.

OTHER PUBLICATIONS

Jinfeng Du et al.,"Time Frequency Localization of Pulse Shaping Filters in OFDM/OQAM Systems", 2007 6th International Conference on Information, Communications & Signal Processing, Dec. 10-13, 2007, pp. 1-5.
Ari Viholainen et al.,"PHYDYAS—Physical layer for dynamic access and cognitive radio", Tech. Rep. D5.1, EU FP7-ICT Future Networks, Jan. 2009. Available at: http://www.ict-phydyas.org/.
Behrouz Farhang-Boroujeny ,"OFDM Versus Filter Bank Multicarrier ", IEEE Signal Processing Magazine,vol. 28, Issue 3, May 2011, pp. 92-112.
C. Lele, J.-P. Javaudin et al.,"Channel estimation methods for preamble-based OFDM/OQAM modulations", 13th European Wireless Conference, Apr. 1-4, 2007,pp. 59-64.
Jinfeng Du et al.,"Novel Preamble-Based Channel Estimation for OFDM/OQAM Systems", 2009 IEEE International Conference on Communications,Jun. 14-18, 2009, pp. 1-6.
Eleftherios Kofidis et al.,"Improved Interference Approximation Method for Preamble-Based Channel Estimation in FBMC/ OQAM", 2011 19th European Signal Processing Conference, Aug. 29-Sep. 2, 2011, pp. 1603-1607.

* cited by examiner

MULTICARRIER COMMUNICATION SYSTEM AND CHANNEL ESTIMATION METHOD THEREOF

CROSS-REFERENCE TO RELATED APPLICATION

This application claims the priority benefit of Taiwan application serial no. 106102851, filed on Jan. 25, 2017. The entirety of the above-mentioned patent application is hereby incorporated by reference herein and made a part of this specification.

BACKGROUND OF THE INVENTION

1. Field of the Invention

The present invention generally relates to wireless/broadband communication technology, in particular, to channel estimation for wireless/broadband multicarrier communication systems.

2. Description of Related Art

To improve transmission performance of wireless/broadband communication systems, multicarrier modulation has been widely adopted. In particular, filter bank multicarrier (FBMC) transmission using offset quadrature amplitude modulation (OQAM) has been considered as a promising technique for this purpose.

The scheme of FBMC transmission using OQAM (called FBMC/OQAM) involves multiple subcarrier channels with different frequency bands for transmitting signals based on a timing scheme, where each subcarrier is for transmission of a symbol in one timing period. Take M subcarrier channels as an example for FBMC/OQAM. In this case, M data symbols are transmitted in one timing period, wherein one symbol represents the real part or the imaginary part of a complex data. For example, the way for the $m^{th}$ subcarrier channel to transmit a complex data $a_{m,n}+ja_{m,n+1}$ can be as follows: transmitting the real-part symbol as $a_{m,n}$ in the $n^{th}$ timing period and then transmitting the imaginary-part symbol as $ja_{m,n+1}$ in the $(n+1)^{th}$ timing period. The transmission of a complex data $a_{m+1,n}+ja_{m+1,n+1}$ on the $(m+1)^{th}$ subcarrier channel is similar, but the real-part symbol is transmitted as $ja_{m+1,n}$ in the $n^{th}$ timing period and the imaginary-part symbol is transmitted as $a_{m+1,n+1}$ in the $(n+1)^{th}$ timing period. According to this arrangement, a sequence of complex data can be placed on M subcarrier channels one-by-one with the real-part symbols and the imaginary-part symbols transmitted alternately in timing periods. In an FBMC/OQAM system, the transmitter equipment transmits multiple data symbols (or called original symbols) to the receiver equipment based on the foregoing manner or another similar way.

In an FBMC/OQAM system, channel estimation for each subcarrier must have sufficient accuracy such that the original symbols transmitted from the transmitter equipment can be correctly detected at the receiver equipment. The conventional approach to overcome this issue is that the transmitter equipment transmits a given preamble for channel estimation at the receiver equipment before actual data transmission. In wireless/broadband transmission, noise or interference is inevitably involved, and this results in a channel estimation error. Therefore, it is essential to reduce the channel estimation error in design of an FBMC/OQAM system.

SUMMARY OF THE INVENTION

The present invention provides a multicarrier communication system, in which a preamble structure is proposed to reduce the channel estimation error and thus to improve the transmission quality.

In an embodiment, the invention provides a multicarrier communication system comprising a transmitter equipment and a receiver equipment. The transmitter equipment, according to a timing scheme, processes multiple original symbols respectively corresponding to multiple subcarrier channels, wherein the original symbols are suitably adjusted with positive phases, up-sampled, and then synthesized as a baseband signal set by a synthesis filter bank for transmission through a channel. The receiver equipment, according to the timing scheme, receives the baseband signal set from the channel, wherein the received baseband signal set is analyzed by an analysis filter bank, down-sampled, suitably adjusted with negative phases, and then processed by a detector to detect out the multiple original symbols transmitted respectively through the multiple subcarrier channels. During a time frame of data transmission, the initial three of the original symbols for each of the subcarrier channels are three given pilot symbols to form a preamble. The three preambles of every consecutive three of the subcarrier channels form a preamble unit, and all the pilot symbols of the preamble unit are expressed as a 3×3 matrix. When the center pilot symbol of the preamble unit is normalized to 1 or j (i.e., the imaginary unit), the 3×3 matrix is a base matrix given by $$\begin{bmatrix} -j & -j & -j \\ j & 1 & -j \\ -j & j & -j \end{bmatrix} \text{ or } \begin{bmatrix} 1 & 1 & 1 \\ -1 & j & 1 \\ 1 & -1 & 1 \end{bmatrix}.$$

In an embodiment, the invention provides a multicarrier communication method comprising: transmitting a baseband signal set from a transmitter equipment by processing multiple original symbols respectively corresponding to multiple subcarrier channels according to a timing scheme, wherein the original symbols are suitably adjusted with positive phases, up-sampled, and then synthesized as a baseband signal set by a synthesis filter bank for transmission through a channel; and receiving the baseband signal set from the channel by using a receiver equipment according to the timing scheme, wherein the received baseband signal set is analyzed by an analysis filter bank, down-sampled, suitably adjusted with negative phases, and then processed by a detector to detect out the multiple original symbols transmitted respectively through the multiple subcarrier channels. During a time frame of data transmission, the initial three of the original symbols for each of the subcarrier channels are three given pilot symbols to form a preamble. The three preambles of every consecutive three of the subcarrier channels form a preamble unit, and all the pilot symbols of the preamble unit are expressed as a 3×3 matrix. When the center pilot symbol of the preamble unit is normalized to 1 or j (i.e., the imaginary unit), the 3×3 matrix is a base matrix given by $$\begin{bmatrix} -j & -j & -j \\ j & 1 & -j \\ -j & j & -j \end{bmatrix} \text{ or } \begin{bmatrix} 1 & 1 & 1 \\ -1 & j & 1 \\ 1 & -1 & 1 \end{bmatrix}.$$

In an embodiment as described for the multicarrier communication system and method, the base matrix is directly used as the preamble unit or is used as the preamble unit after multiplied by a non-zero constant.

In an embodiment as described for the multicarrier communication system and method, the corresponding multicarrier transmission and modulation schemes include (but not limited to) FBMC/OQAM.

In an embodiment as described for the multicarrier communication system and method, the frequency band of each subcarrier channel is different from those of the other subcarrier channels.

In an embodiment as described for the multicarrier communication system and method, the receiver equipment estimates the channel response of each center subcarrier corresponding to the center pilot symbol of each preamble unit in a way that the mean-squared error of channel estimation is minimized.

In an embodiment as described for the multicarrier communication system and method, for each center subcarrier corresponding to the center pilot symbol of each preamble unit, the channel responses of the front and back subcarriers are calculated by interpolation of all the estimated center subcarriers' responses.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

For data transmission by a multicarrier communication system, the invention proposes a preamble unit associated with a time-frequency data structure. It is helpful to reduce the channel estimation error.

The multicarrier communication system in the invention takes FBMC/OQAM as an example for descriptions but not limited thereto. Likewise, the invention is not just limited to the following embodiments.

Figure 1:
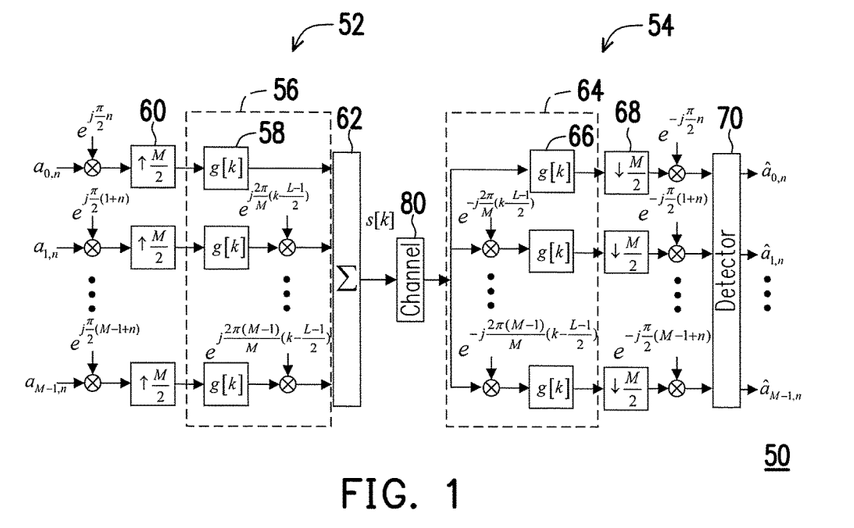
FIG. 1 is a drawing, schematically illustrating the baseband structure of a multicarrier communication system, according to an embodiment of the invention.

FIG. 1 is a drawing, schematically illustrating the baseband structure of a multicarrier communication system, according to an embodiment of the invention. Referring to FIG. 1, the multicarrier communication system 50 is an FBMC/OQAM system, basically including a transmitter equipment 52 and a receiver equipment 54. With M subcarriers as an example, all of them have different frequency bands to form M multiple subcarrier channels, and each subcarrier channel is used to transmit one data symbol in one timing period.

As a general structure, the transmitter equipment 52 processes multiple original symbols $a_{0,n}, a_{1,n}, \ldots, a_{M-1,n}$ respectively corresponding to multiple subcarrier channels, wherein the original symbols are multiplied by $e^{j\pi(n)/2}$, $e^{j\pi(n+1)/2}, \ldots, e^{j\pi(n+M-1)/2}$ (i.e., adjusted appropriately by positive phases) according to the order of the corresponding frequency bands, processed by M pieces of the up-sampler 60, synthesized by the synthesis filter bank 56, and summed together by the summing unit 62. As a result, the baseband signal set s[k] is formed, where k represents the index of a timing period after up-sampling. The synthesis filter for the case of M subcarrier channels includes M pieces of the synthesis filter g[k] 58, which is a symmetrical real-valued prototype filter with length L, and M−1 multipliers for realizing M−1 subcarrier modulation operations. The filter length L is usually set by an even multiple of M, but is not limited to this case. The baseband signal set s[k] generated by the summing unit 62 is transmitted out through the channel 80. If the original symbols $a_{0,n}, a_{1,n}, \ldots, a_{M-1,n}$ transmitted at the $n^{th}$ timing period before up-sampling are the real parts of a sequence of complex data $(a_{m,n}+ja_{m,n+1}, m=0, 1, 2, \ldots, M-1)$, then the original symbols transmitted at the $(n+1)^{th}$ timing period could be the corresponding imaginary parts $(a_{0,n+1}, a_{1,n+1}, \ldots, a_{M-1,n+1})$, and vice versa. In this manner, the real-part symbols and the imaginary-part symbols of the complex data are alternately transmitted in timing periods. However, as to be described in detail later, the preamble symbols are transmitted before actual data symbols in order for doing channel estimation.

In the transmitter equipment 52, the baseband signal set s[k] theoretically can be expressed by Eq. (1):

$$s[k] = \sum_{m=0}^{M-1} \sum_{n=-\infty}^{+\infty} a_{m,n} \underbrace{g\left[k-n\frac{M}{2}\right] e^{j\frac{2\pi}{M}m\left(k-\frac{L-1}{2}\right)} e^{j\pi(m+n)/2}}_{g_{m,n}[k]}. \quad (1)$$

The receiver equipment 54 receives a distorted version of the baseband signal set s[k] transmitted from the channel 80 based on to the same timing scheme as that used for the transmitter equipment 52. After analyzed by the analysis filter bank 64, down-sampled by M pieces of the down-sampler 68, and multiplied by $e^{-j\pi(n)/2}, e^{-j\pi(n+1)/2}, \ldots, e^{-j\pi(n+M-1)/2}$ (i.e., adjusted appropriately by negative phases), the signal set is processed by the detector 70 to detect out the multiple original symbols $(\hat{a}_{0,n}, \hat{a}_{1,n}, \ldots, \hat{a}_{M-1,n})$ transmitted respectively through the multiple subcarrier channels. The analysis filter bank for the case of M subcarriers includes M−1 multipliers and M pieces of the analysis filters g[k] 66 to perform the reversal process of the synthesis filter bank 56. The complete operation mechanism of an FBMC/OQAM system can be referred to previous related work without further descriptions.

The baseband signal set s[k] usually encounters noise or interference, such as additive white Gaussian noise (η[k]), during transmission through the channel 80. Let h[k] be the impulse response of the channel 80. Then the received signal y[k] at the receiver equipment 54 can be expressed by Eq. (2):

$$y[k]=h[k]*s[k]+\eta[k]. \quad (2)$$

Denote the frequency response (i.e., channel gain) of the $m^{th}$ subcarrier channel at the $k^{th}$ timing period by $H_m[k]$. Also, assume that the maximum channel delay spread $\Delta$ is much shorter than the FBMC symbol duration. Moreover, assume that the prototype filter $g[k]$ varies slowly in time between the interval $[k, k+\Delta]$, i.e., $g[k] \approx g[k+\tau]$ for $\tau \in (0, \Delta)$. Under on these two assumptions, the channel gain of each subcarrier can be regarded as a constant during the interval of $\tau$, that is, $H_m[k]=H_{m,n}$. Thus, $y[k]$ can be expressed by Eq. (3):

$$y[k] = \sum_{n=-\infty}^{+\infty} \sum_{m=0}^{M-1} a_{m,n} g_{m,n}[k] H_{m,n} + \eta[k]. \tag{3}$$

In addition, the detected signal $\hat{a}_{m,n}$ on subcarrier m can be obtained by computing the inner product of $y[k]$ and $g_{m,n}[k]$ defined in Eq. (1), as expressed by Eq. (4):

$$\hat{a}_{m,n} = H_{m,n} a_{m,n} + \sum_{(p,q) \neq (0,0)} H_{m+p,n+q} a_{m+p,n+q} \langle g \rangle_{m+p,n+q}^{m,n} + \eta_{m,n}, \tag{4}$$

where $\langle g \rangle_{m+p,n+q}^{m,n} = \sum_{k=-\infty}^{+\infty} g_{m+p,n+q}[k] g_{m,n}^*[k]$ is equal to one for $(p,q)=(0,0)$ and is purely imaginary when $(p,q) \neq (0,0)$; $\eta_{m,n}$ is a zero-mean circularly-symmetric complex Gaussian noise with variance $\sigma_\eta^2$.

Usually, a subband formed by three consecutive subcarrier channels would just have a small amount of fading during three consecutive timing periods. Therefore, the frequency-domain channel gain within three consecutive timing periods for the three subcarrier channels is about a constant, that is, $H_{m\pm 1, n\pm 1} \approx H_{m,n}$.

Then, the detected signal $\hat{a}_{m,n}$ given in Eq. (4) can be expressed by Eq. (5):

$$\hat{a}_{m,n} = H_{m,n} \begin{pmatrix} a_{m,n} + a_{m+1,n+1} \langle g \rangle_{m+1,n+1}^{m,n} + a_{m+1,n} \langle g \rangle_{m+1,n}^{m,n} + \\ a_{m+1,n-1} \langle g \rangle_{m+1,n-1}^{m,n} + a_{m,n+1} \langle g \rangle_{m,n+1}^{m,n} + a_{m,n-1} \langle g \rangle_{m,n-1}^{m,n} + \\ a_{m-1,n+1} \langle g \rangle_{m-1,n+1}^{m,n} + a_{m-1,n} \langle g \rangle_{m-1,n}^{m,n} + a_{m-1,n-1} \langle g \rangle_{m-1,n-1}^{m,n} \end{pmatrix} + \sum_{p \geq 1, q \geq 1} H_{m\pm p, n\pm q} a_{m\pm p, n\pm q} \langle g \rangle_{m\pm p, n\pm q}^{m,n} + \eta_{m,n}. \tag{5}$$

Since the sidelobe of the prototype filter is small, the first term on the right-hand side of Eq. (5) is much larger than the second term, and the second term can be neglected. With this, Eq. (5) can be further simplified as Eq. (6):

$$\hat{a}_{m,n} \approx H_{m,n} \begin{pmatrix} a_{m,n} + a_{m+1,n+1} \langle g \rangle_{m+1,n+1}^{m,n} + a_{m+1,n} \langle g \rangle_{m+1,n}^{m,n} + \\ a_{m+1,n-1} \langle g \rangle_{m+1,n-1}^{m,n} + a_{m,n+1} \langle g \rangle_{m,n+1}^{m,n} + a_{m,n-1} \langle g \rangle_{m,n-1}^{m,n} + \\ a_{m-1,n+1} \langle g \rangle_{m-1,n+1}^{m,n} + a_{m-1,n} \langle g \rangle_{m-1,n}^{m,n} + a_{m-1,n-1} \langle g \rangle_{m-1,n-1}^{m,n} \end{pmatrix} + \eta_{m,n}. \tag{6}$$

For ease of presentation, the invention takes the $m^{th}$ subcarrier channel at the $1^{st}$ time period as a center to define the 3×3 matrix for a preamble unit, as expressed by Eq. (7):

$$\begin{bmatrix} a_{m-1,0} & a_{m-1,1} & a_{m-1,2} \\ a_{m,0} & a_{m,1} & a_{m,2} \\ a_{m+1,0} & a_{m+1,1} & a_{m+1,2} \end{bmatrix}. \tag{7}$$

In other words, during a time frame of data transmission, the pilot symbols $\{a_{m+1,0}, a_{m-1,1}, a_{m+1,2}\}$, $\{a_{m,0}, a_{m,1}, a_{m,2}\}$, $\{a_{m+1,0}, a_{m+1,1}, a_{m+1,2}\}$ at the initial three consecutive timing periods for the subcarrier channels m−1, m, and m+1 form a preamble unit. Accordingly, the channel gain $H_{m,1}$ for the $m^{th}$ subcarrier channel at the $1^{st}$ timing period can be estimated as Eq. (8):

$$\hat{H}_{m,1} = \frac{(\hat{a}_{m,1})}{\begin{pmatrix} a_{m,1} + a_{m+1,2} \langle g \rangle_{m+1,2}^{m,1} + a_{m+1,1} \langle g \rangle_{m+1,1}^{m,1} + \\ a_{m+1,0} \langle g \rangle_{m+1,0}^{m,1} + a_{m,2} \langle g \rangle_{m,2}^{m,1} + \\ a_{m,0} \langle g \rangle_{m,0}^{m,1} + a_{m-1,2} \langle g \rangle_{m-1,2}^{m,1} + \\ a_{m-1,1} \langle g \rangle_{m-1,1}^{m,1} + a_{m-1,0} \langle g \rangle_{m-1,0}^{m,1} \end{pmatrix}} = \tag{8}$$

$$H_{m,1} + \frac{(\eta_{m,1})}{\begin{pmatrix} a_{m,1} + a_{m+1,2} \langle g \rangle_{m+1,2}^{m,1} + a_{m+1,1} \langle g \rangle_{m+1,1}^{m,1} + \\ a_{m+1,0} \langle g \rangle_{m+1,0}^{m,1} + a_{m,2} \langle g \rangle_{m,2}^{m,1} + \\ a_{m,0} \langle g \rangle_{m,0}^{m,1} + a_{m-1,2} \langle g \rangle_{m-1,2}^{m,1} + \\ a_{m-1,1} \langle g \rangle_{m-1,1}^{m,1} + a_{m-1,0} \langle g \rangle_{m-1,0}^{m,1} \end{pmatrix}}.$$

Performance of the channel gain estimation based on Eq. (8) can be analyzed by the mean-squared error (MSE) expressed by Eq. (9):

$$E\{|\hat{H}_{m,1} - H_{m,1}|^2\} = E\left\{ \left| \frac{\eta_{m,1}}{\begin{pmatrix} a_{m,1} + a_{m+1,2} \langle g \rangle_{m+1,2}^{m,1} + \\ a_{m+1,1} \langle g \rangle_{m+1,1}^{m,1} + \\ a_{m+1,0} \langle g \rangle_{m+1,0}^{m,n} + a_{m,2} \langle g \rangle_{m,2}^{m,1} + \\ a_{m,0} \langle g \rangle_{m,0}^{m,1} + a_{m-1,2} \langle g \rangle_{m-1,2}^{m,1} + \\ a_{m-1,1} \langle g \rangle_{m-1,1}^{m,1} + a_{m-1,0} \langle g \rangle_{m-1,0}^{m,1} \end{pmatrix}} \right|^2 \right\}$$

$$= \frac{\sigma_\eta^2}{\left| \begin{matrix} a_{m,1} + a_{m+1,2} \langle g \rangle_{m+1,2}^{m,1} + a_{m+1,1} \langle g \rangle_{m+1,1}^{m,1} + \\ a_{m+1,0} \langle g \rangle_{m+1,0}^{m,1} + a_{m,2} \langle g \rangle_{m,2}^{m,1} + \\ a_{m,0} \langle g \rangle_{m,0}^{m,1} + a_{m-1,2} \langle g \rangle_{m-1,2}^{m,1} + \\ a_{m-1,1} \langle g \rangle_{m-1,1}^{m,1} + a_{m-1,0} \langle g \rangle_{m-1,0}^{m,1} \end{matrix} \right|^2}$$

$$= \frac{\sigma_\eta^2}{\left| \begin{matrix} a_{m,1} + (j\delta) a_{m+1,2} + (-j\beta) a_{m+1,1} + \\ (j\delta) a_{m+1,0} + (j\gamma) a_{m,2} + \\ (-j\gamma) a_{m,0} + (j\delta) a_{m-1,2} + \\ (j\beta) a_{m-1,1} + (j\delta) a_{m-1,0} \end{matrix} \right|^2}$$

(9)

$$= \frac{\sigma_\eta^2}{\left| a_{m,1} + j \begin{pmatrix} \beta(a_{m-1,1} - a_{m+1,1}) + \\ \gamma(a_{m,2} - a_{m,0}) + \\ \delta(a_{m+1,2} + a_{m+1,0} + \\ a_{m-1,2} + a_{m-1,0}) \end{pmatrix} \right|^2}$$

where $E\{\cdot\}$ represents the statistical expectation operation and $\beta$, $\gamma$, and $\delta$ are all positive with values smaller than one, expressed by Eq. (10):

$$\begin{cases} \beta = j \langle g \rangle_{m+1,1}^{m,1} = -j \langle g \rangle_{m-1,1}^{m,1} = -\sum_k g^2[k - M/2] e^{j\frac{2\pi}{M}(k-\frac{L-1}{2})} \\ \gamma = -j \langle g \rangle_{m,2}^{m,1} = j \langle g \rangle_{m,0}^{m,1} = \sum_k g[k - M]g[k - M/2] \\ \delta = -j \langle g \rangle_{m-1,0}^{m,1} = -j \langle g \rangle_{m-1,2}^{m,1} = -j \langle g \rangle_{m+1,0}^{m,1} = \\ -j \langle g \rangle_{m+1,2}^{m,1} = j \sum_k g[k] g[k - M/2] e^{-j\frac{2\pi}{M}(k-\frac{L-1}{2})} \end{cases} \quad (10)$$

According to Eq. (9) and Eq. (10), increasing the value of the denominator can reduce the MSE, where the denominator is in the form of $|a+jb|^2$. Also, for a given prototype filter $g[k]$, the interference tell is on the center pilot symbol $a_{m,1}$ from all the peripheral pilot symbols can be generated with the interference coefficients $\pm j\beta$, $\pm j\gamma$, and $j\delta$ from Eq. (10).

Figure 2:
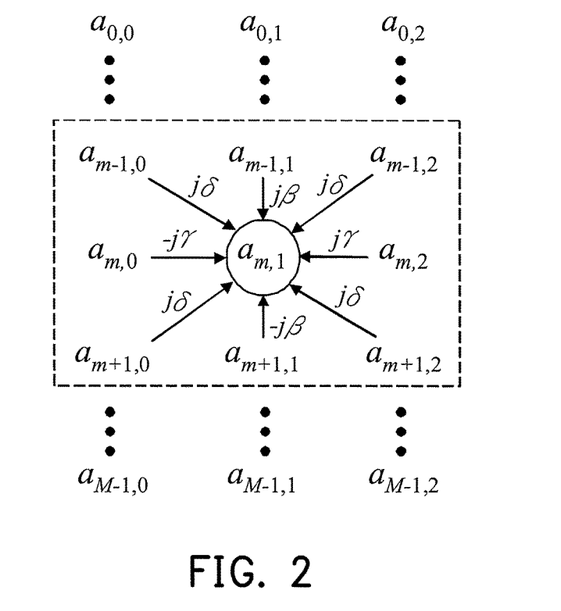
FIG. 2 is a drawing, schematically illustrating a mechanism of interference effects on the center pilot symbol from all the peripheral pilot symbols in a preamble unit, according to an embodiment of the invention.

FIG. 2 is a drawing, schematically illustrating a mechanism of interference effects on the center pilot symbol from all the peripheral pilot symbols in a preamble unit, according to an embodiment of the invention. Each peripheral pilot symbol times the corresponding interference coefficient to produce an interference term on the center pilot symbol $a_{m,1}$, as shown by the arrows in FIG. 2.

To make the denominator term $|a+jb|^2$ reach the maximum value and then to minimize the MSE, one of the following two conditions can be adopted to determine a and b: (1) a is positive (or negative) real and $b=-j|b|$ (or $b=j|b|$); (2) $a=j|a|$ (or $a=-j|a|$) and b is positive (or negative) real. Following conditions 1 and 2, the center pilot symbol $a_{m,1}$ and the other 8 peripheral pilot symbols in FIG. 2, i.e., the matrix for a preamble unit defined in Eq. (7), can be set by Eq. (11) or Eq. (12):

$$\begin{bmatrix} -j & -j & -j \\ j & 1 & -j \\ -j & j & -j \end{bmatrix} \quad (11)$$

$$\begin{bmatrix} 1 & 1 & 1 \\ -1 & j & 1 \\ 1 & -1 & 1 \end{bmatrix} \quad (12)$$

These are the base matrices for a preamble unit with the center pilot symbol normalized to 1 or j. The center pilot symbol of the invention is not limited to 1 or j, and the base matrix can be multiplied by a non-zero constant to form a preamble unit.

Take the pilot symbol $a_{m-1,1}$ of the subcarrier channel m−1 as an example, where the interference coefficient to the center pilot symbol $a_{m,1}$ is "$j\beta$". If $a_{m-1,1}$ is set to "−j" and $a_{m,1}$ is set to "1" as the case given in Eq. (11), then $j\beta \times (-j) = \beta$, which would cause a maximum interference to the center pilot symbol. If each of the other peripheral pilot symbols is also set in a similar way to maximize its interference to the center pilot symbol, the denominator of the MSE in Eq. (9) would approach the maximum, and thus the MSE would approach the minimum.

Figure 3:
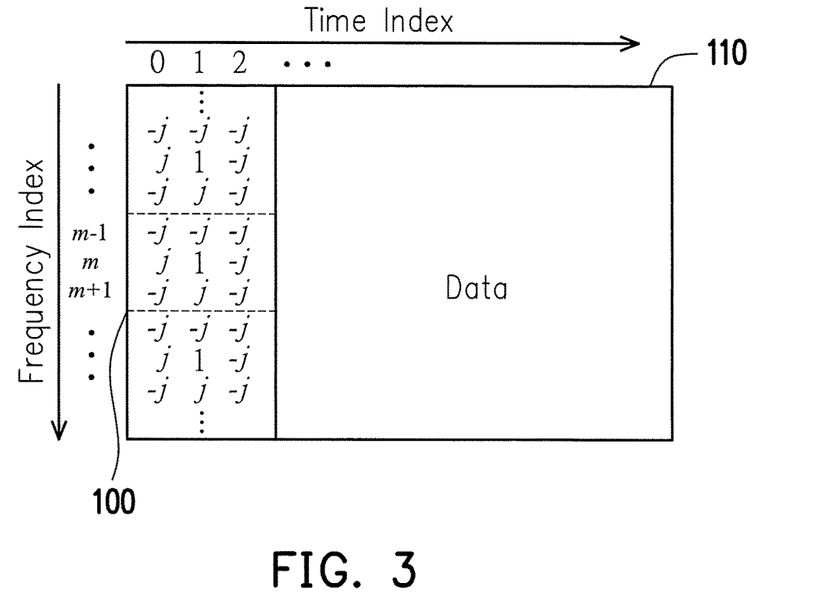
FIG. 3 is a drawing, schematically illustrating a time-frequency symbol structure including preamble units and data to be transmitted, according to an embodiment of the invention.

FIG. 3 is a drawing, schematically illustrating a time-frequency symbol structure including preamble units and data to be transmitted, according to an embodiment of the invention. Refer to FIG. 3 and take Eq. (11) as an example for the preamble unit. Under the operation of the multicarrier communication system in FIG. 1, the time-frequency symbol structure 110 includes the preamble part 100 for channel estimation and a data part to be transmitted. The timing periods are indexed by 0, 1, 2, . . . from left to right, and the subcarrier channels (frequency bands) are indexed by 0, 1, . . . , m−1, m, m+1, . . . , M−1 from top to bottom for the case of M subcarriers. All symbols placed at the initial three time indices 0, 1, 2 are pilot symbols, and those of every three consecutive subcarrier channels (e.g., with frequency indices m−1, in, m+1 as shown in FIG. 3) form a preamble unit with the center pilot symbol at the time index 1. The preamble part 100 consists of a number of preamble units whose pilot symbols are set by some specific values according to Eq. (11), and the data part is placed alternately in time indices with the real-part symbols and the imaginary-part symbols of a sequence of complex data. All these symbols are transmitted by the transmitter equipment 52 in FIG. 1 according to the timing scheme.

According to the preamble structure in FIG. 3, the channel gains for subcarriers m=$m_c$=1, 4, 7, 10, . . . are first estimated, each corresponding to the channel gain for the center pilot symbol in each preamble unit. Then, the channel gains for the other subcarriers $m_c$−1 and $m_c$+1 are obtained by interpolation of the estimated results for subcarrier channels $m_c$=1, 4, 7, 10, . . . .

The invention further compares the proposed preamble unit with some other prior preamble structures, where FIG. 4 to FIG. 7 are drawings for schematically illustrating the corresponding time-frequency symbol structures.

Figure 4:
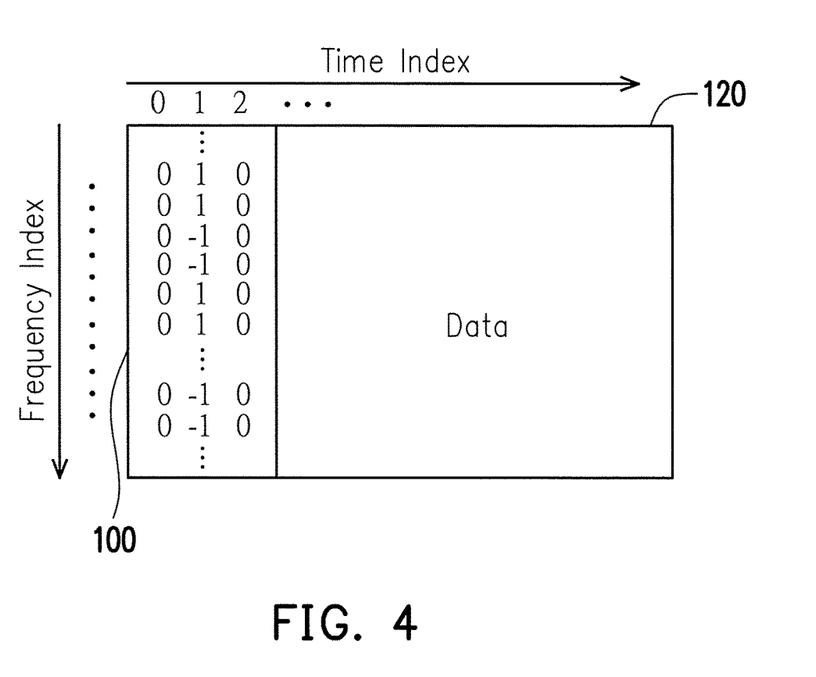
FIG. 4 is a drawing, schematically illustrating the time-frequency symbol structure for the IAM-R scheme.

As shown in FIG. 4, the symbols are all 0's at time indices 0 and 2 in the preamble part 100 of the time-frequency symbol structure 120, and those at time index 1 are 1, 1, −1, −1, 1, 1, −1, −1, . . . for subcarriers 0, 1, 2, . . . , wherein a pattern of 1, 1, −1, −1 repeats every four subcarrier channels. The time-frequency symbol structure 120 is also called the IAM-R scheme.

Figure 5:
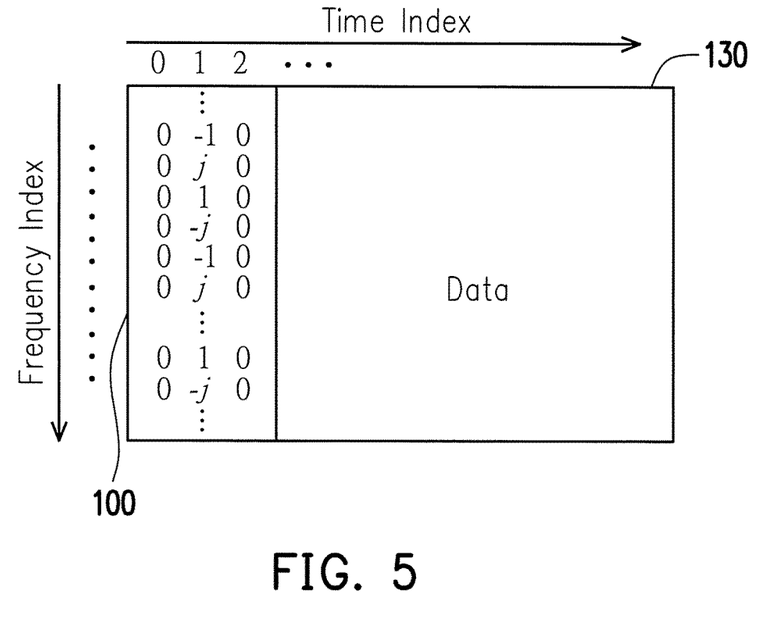
FIG. 5 is a drawing, schematically illustrating the time-frequency symbol structure for the IAM-C scheme.

As shown in FIG. 5, the symbols are all 0's at time indices 0 and 2 in the preamble part 100 of the time-frequency symbol structure 130, and those at time index 1 are −1, j, 1, −j, −1, j, 1, −j for subcarriers 0, 1, 2, . . . , where a pattern of −1, j, 1, −j repeats every four subcarrier channels. The time-frequency symbol structure 130 is also called the IAM-C scheme.

Figure 6:
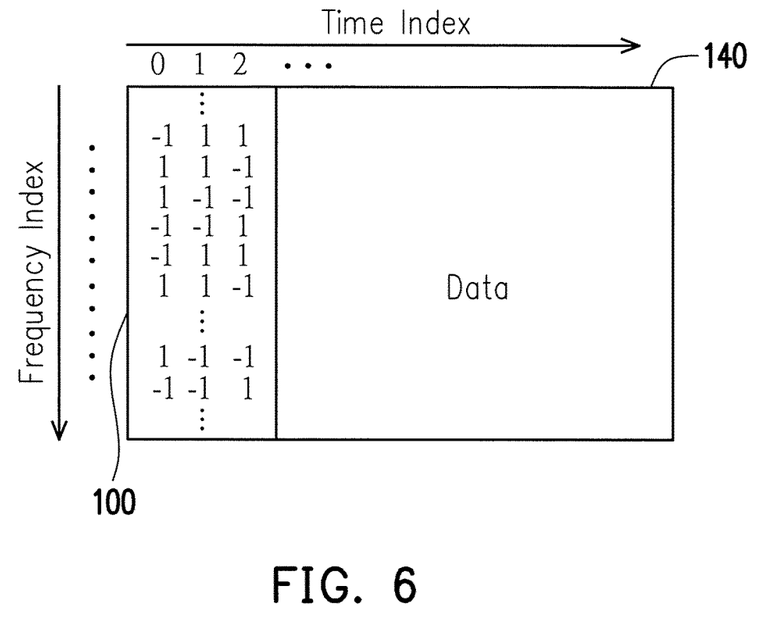
FIG. 6 is a drawing, schematically illustrating the time-frequency symbol structure for the E-IAM-R scheme.

As shown in FIG. 6, the preamble part 100 of the time-frequency symbol structure 140 is modified from the structure in FIG. 4. The symbols at time index 0 are set by a repeated pattern of −1, 1, 1, −1, those at time index 1 are set by a repeated pattern of 1, 1, −1, −1, and those at time index of 2 are set by a repeated pattern of 1, −1, −1, 1. The time-frequency symbol structure 140 is also called the E-IAM-R scheme.

Figure 7:
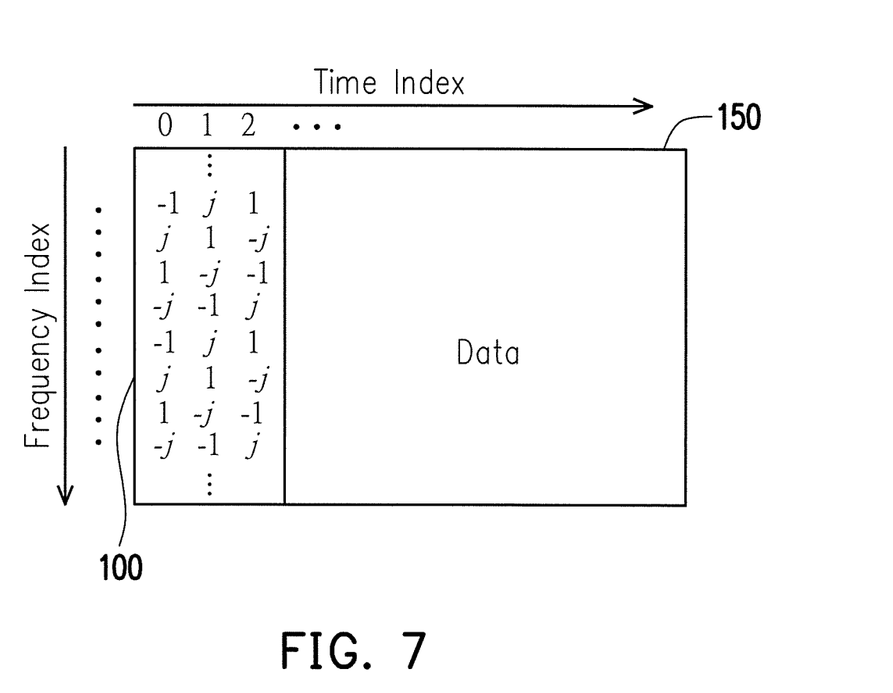
FIG. 7 is a drawing, schematically illustrating the time-frequency symbol structure for the E-IAM-C scheme.

As shown in FIG. 7, the symbols at time index 0 are set by a repeated pattern of −1, j, 1, −j in the preamble part 100 of the time-frequency symbol structure 150, those at time index 1 are set by a repeated pattern of j, 1, −j, −1, and those at time index 2 are set by a repeated pattern of 1, −j, −1, j. The time-frequency symbol structure 150 is also called the E-IAM-C scheme.

The MSE analysis results of channel estimation for the time-frequency symbol structures in FIG. 3 to FIG. 7 are listed in Table 1, where β, γ, and δ are all positive. It is clear that the invention has a relatively small MSE for channel estimation.

TABLE 1

| Scheme | MSE |
| --- | --- |
| IAM-R | $\sigma_\eta^2/(1 + 4\beta)$ |
| IAM-C | $\sigma_\eta^2/(1 + 4\beta + 4\beta^2)$ |
| E-IAM-R | $\sigma_\eta^2/(1 + 8\beta\gamma + 4\beta^2 + 4\gamma^2)$ |
| E-IAM-C | $\sigma_\eta^2/(1 + 2\beta + 2\gamma)^2$ |
| The invention | $\sigma_\eta^2/(1 + 2\beta + 2\gamma + 4\delta)^2$ |

In addition, simulation results of the foregoing schemes with different prototype filters g[k] have also shown that the invention outperforms the other schemes in terms of the MSE of channel estimation and the bit-error-rate of data transmission.

In summary, the multicarrier communication system, the preamble structure, and the channel estimation method thereof provided by the invention can effectively reduce the MSE of channel estimation and thus improve the transmission quality.

It will be apparent to those skilled in the art that various modifications and variations can be made to the structure of the present invention without departing from the scope or spirit of the invention. In view of the foregoing, it is intended that the present invention covers such modifications and variations provided they fall within the scope of the following claims and their equivalents.

What is claimed is:

1. A multicarrier communication system, comprising:
a transmitter equipment, according to a timing scheme, processing multiple original symbols respectively corresponding to multiple subcarrier channels, wherein the original symbols are suitably adjusted with positive phases, up-sampled, and then synthesized as a baseband signal set by a synthesis filter bank for transmission through a channel; and
a receiver equipment, according to the timing scheme, receiving the baseband signal set from the channel, wherein the received baseband signal set is analyzed by an analysis filter bank, down-sampled, suitably adjusted with negative phases, and then processed by a detector to detect out the multiple original symbols transmitted respectively through the multiple subcarrier channels,
wherein during a time frame of data transmission, the initial three of the original symbols for each of the subcarrier channels are three given pilot symbols to form a preamble, the three preambles of every consecutive three of the subcarrier channels form a preamble unit, all the pilot symbols of the preamble unit are expressed as a 3×3 matrix, and, when the center pilot symbol of the preamble unit is normalized to 1 or an imaginary unit represented by j, the 3×3 matrix is a base matrix given by $$\begin{bmatrix} -j & -j & -j \\ j & 1 & -j \\ -j & j & -j \end{bmatrix} \text{ or } \begin{bmatrix} 1 & 1 & 1 \\ -1 & j & 1 \\ 1 & -1 & 1 \end{bmatrix}.$$

2. The multicarrier communication system according to claim 1, wherein the base matrix is directly used as the preamble unit or is used as the preamble unit after multiplied by a non-zero constant.

3. The multicarrier communication system according to claim 1, wherein the corresponding multicarrier transmission and modulation schemes include filter bank multicarrier (FBMC) transmission with offset quadrature amplitude modulation (OQAM).

4. The multicarrier communication system according to claim 1, wherein the frequency band of each subcarrier channel is different from those of the other subcarrier channels.

5. The multicarrier communication system according to claim 1, wherein the receiver equipment estimates the channel response of each center subcarrier corresponding to the center pilot symbol of each preamble unit in a way that the mean-squared error of channel estimation is minimized.

6. The multicarrier communication system according to claim 5, wherein, for each center subcarrier corresponding to the center pilot symbol of each preamble unit, the channel responses of the front and back subcarriers are calculated by interpolation of all the estimated center subcarriers' responses.

7. A multicarrier communication method, comprising:
transmitting a baseband signal set from a transmitter equipment by processing multiple original symbols respectively corresponding to multiple subcarrier channels according to a timing scheme, wherein the original symbols are suitably adjusted with positive phases, up-sampled, and then synthesized as a baseband signal set by a synthesis filter bank for transmission through a channel; and
receiving the baseband signal set from the channel by using a receiver equipment according to the timing scheme, wherein the received baseband signal set is analyzed by an analysis filter bank, down-sampled, suitably adjusted with negative phases, and then processed by a detector to detect out the multiple original symbols transmitted respectively through the multiple subcarrier channels,
wherein during a time frame of data transmission, the initial three of the original symbols for each of the subcarrier channels are three given pilot symbols to form a preamble, the three preambles of every consecutive three of the subcarrier channels form a preamble unit, all the pilot symbols of the preamble unit are expressed as a 3×3 matrix, and, when the center pilot symbol of the preamble unit is normalized to 1 or an imaginary unit represented by j, the 3×3 matrix is a base matrix given by $$\begin{bmatrix} -j & -j & -j \\ j & 1 & -j \\ -j & j & -j \end{bmatrix} \text{ or } \begin{bmatrix} 1 & 1 & 1 \\ -1 & j & 1 \\ 1 & -1 & 1 \end{bmatrix}.$$

8. The multicarrier communication method according to claim 7, wherein the base matrix is directly used as the preamble unit or is used as the preamble unit after multiplied by a non-zero constant.

9. The multicarrier communication method according to claim 7, wherein the corresponding multicarrier transmission and modulation schemes include filter bank multicarrier (FBMC) transmission with offset quadrature amplitude modulation (OQAM).

10. The multicarrier communication method according to claim 7, wherein the frequency band of each subcarrier channel is different from those of the other subcarrier channels.

11. The multicarrier communication method according to claim 7, wherein the receiver equipment estimates the channel response of each center subcarrier corresponding to the center pilot symbol of each preamble unit in a way that the mean-squared error of channel estimation is minimized.

12. The multicarrier communication method according to claim 11, wherein, for each center subcarrier corresponding to the center pilot symbol of each preamble unit, the channel responses of the front and back subcarriers are calculated by interpolation of all the estimated center subcarriers' responses.

* * * * *